United States Patent [19]

Hansen

[11] Patent Number: 4,858,203
[45] Date of Patent: * Aug. 15, 1989

[54] OMNIDIRECTIONAL DISTANCE MEASUREMENT SYSTEM

[75] Inventor: Per K. Hansen, Burlington, Vt.

[73] Assignee: Position Orientation Systems, Inc., Burlington, Vt.

[*] Notice: The portion of the term of this patent subsequent to Mar. 19, 2002 has been disclaimed.

[21] Appl. No.: 780,192

[22] Filed: Sep. 26, 1985

[51] Int. Cl.⁴ .............................................. G01S 15/08
[52] U.S. Cl. .................................. 367/103; 367/900; 367/905
[58] Field of Search .................... 367/93, 99, 103, 140, 367/903, 905, 909, 98, 134, 900; 73/642; 181/184, 198

[56] References Cited

U.S. PATENT DOCUMENTS

| | | | |
|---|---|---|---|
| 2,561,851 | 7/1951 | Fryklund | 367/903 |
| 3,617,995 | 11/1971 | Goulet | 367/900 |
| 3,961,321 | 6/1976 | Moss | 367/93 |
| 4,081,626 | 3/1978 | Muggli et al. | 367/905 |
| 4,326,273 | 4/1982 | Vancha | 367/112 |
| 4,356,850 | 11/1982 | Halgrimson et al. | 367/96 |
| 4,420,824 | 12/1983 | Weber | 367/900 |
| 4,500,977 | 2/1985 | Gelhard | 367/909 |
| 4,506,354 | 3/1985 | Hansen | 367/108 |
| 4,656,870 | 4/1987 | Ruthrof et al. | 73/629 |

FOREIGN PATENT DOCUMENTS

2045435 10/1980 United Kingdom ................ 367/103

Primary Examiner—Thomas H. Tarcza
Assistant Examiner—Daniel T. Pihulic
Attorney, Agent, or Firm—Sherman & Shalloway

[57] ABSTRACT

Disclosed herein is an omnidirectional distance measurement system which transmits and receives ultrasound waves using as many as four transmitting-receiving transducers having specially shaped beamwidths. Through the use of four such ultrasonic transducers, the system may be set up to obtain any beamwidth from 5° up to 360° in both the horizontal and vertical planes. In the preferred embodiment, the present invention is able to detect the distance and direction to up to four objects in a prescribed work area at any one time and may also detect the speed of any one of the objects if desired.

26 Claims, 8 Drawing Sheets

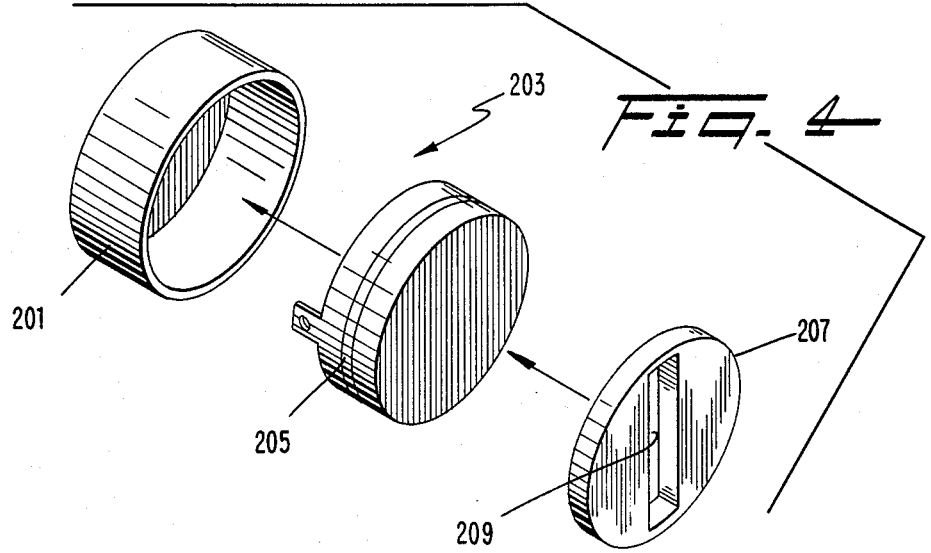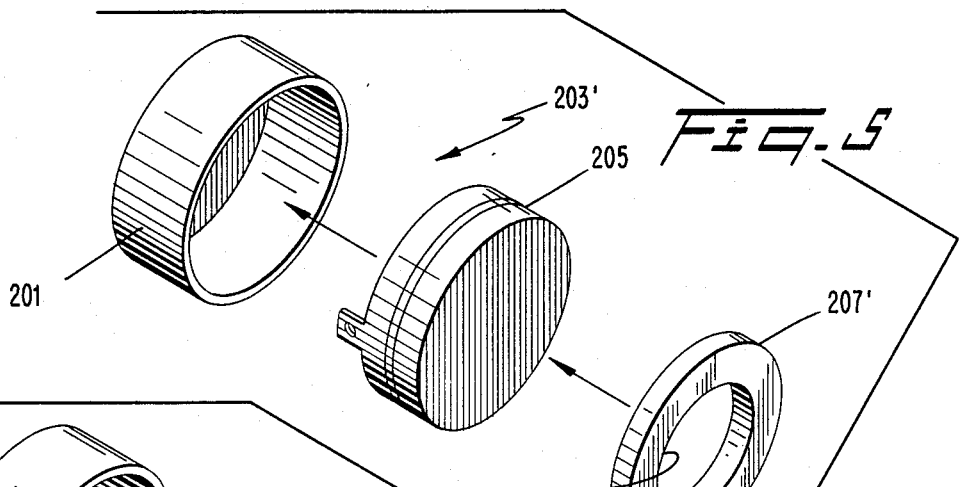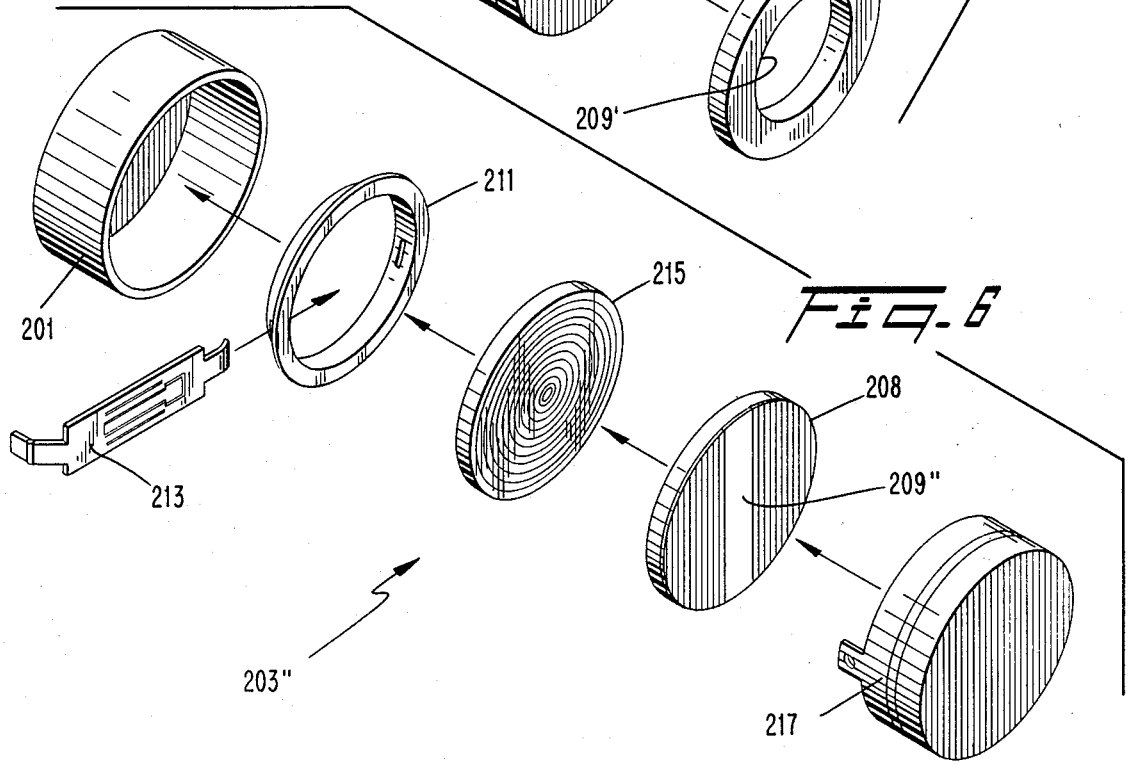

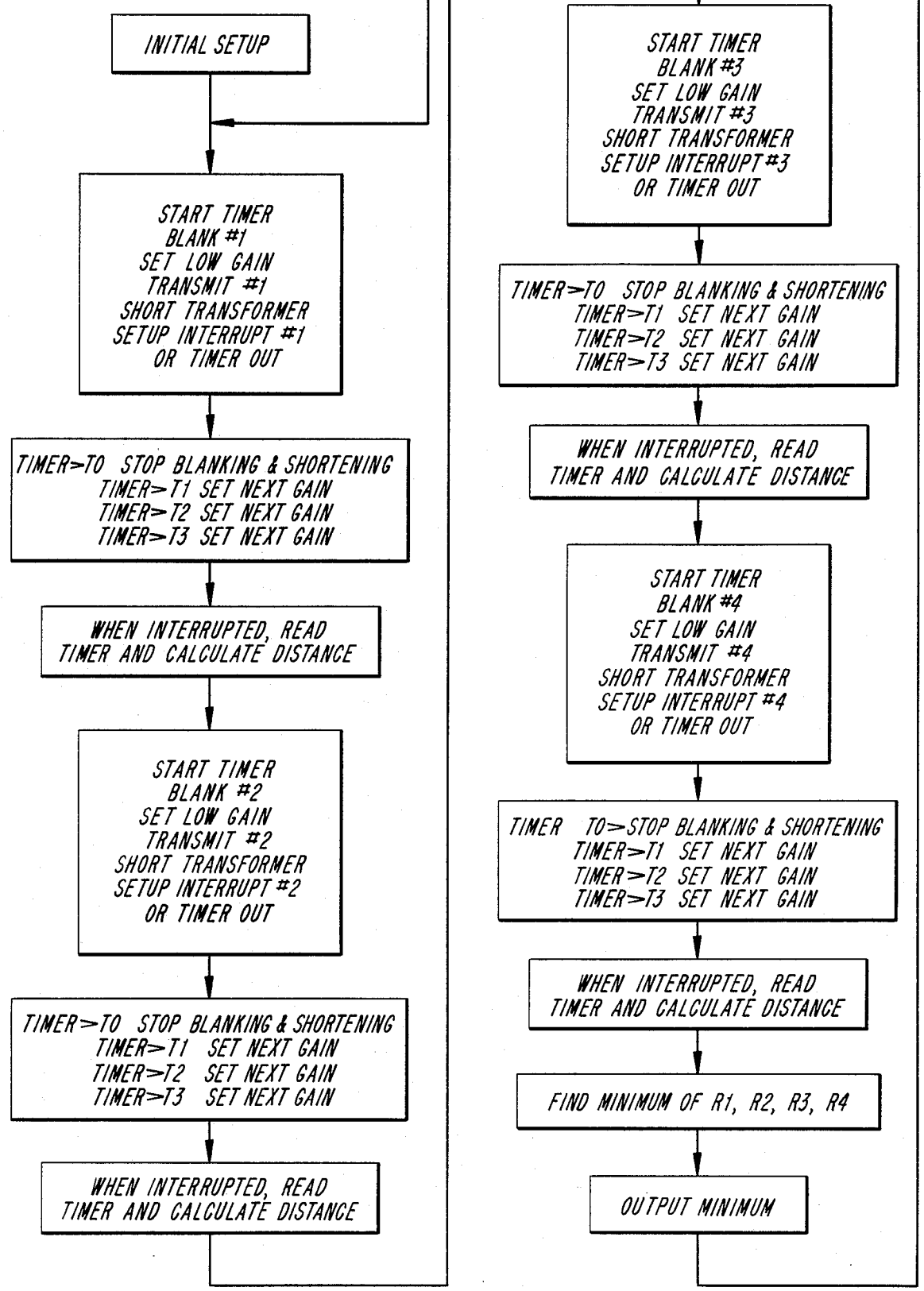

OMNIDIRECTIONAL DISTANCE MEASUREMENT SYSTEM

BACKGROUND OF THE INVENTION

In the prior art, many distance measurement systems exist, however, to the knowledge of Applicant, none of the existing systems have the flexibility of beamwidth shaping, ease of control, flexibility of reprogramming, low cost and minimization of components as are the case with the present invention.

In prior art systems known to Applicant, the ultrasonic transducers thereof are characterized by fixed beamwidth in both the horizontal and vertical planes which renders these systems inflexible for the many uses contemplated for the present invention. In another deficiency in the prior art, most distance measuring systems utilize a first transducer for transmitting and a second transducer for receiving. With such systems, it is quite possible that confusion will exist especially when the receiving transducer may be receiving signals which are not related to those which have previously been transmitted by the transmitting transducer. The following prior art references which are believed to be only generally related to the teachings of the present invention are known to Applicant:

Cudworth U.S. Pat. No. 3,226,673 discloses a device for indicating objects rearwardly of a vehicle which device includes a plurality of signal emitting transducers which may be mounted in transversely spaced relationship on the rear bumper of a vehicle. When an object is within a predetermined short distance of the rear of the vehicle an indication is given to the driver of the vehicle through the energization of an emergency or danger signalling circuit so that the driver knows that the vehicle is dangerously close to the object. This system utilizes separate transducers for the transmitting and receiving functions. This system is different from the present invention for several reasons. Firstly, the Cudworth system uses separate transmitting and receiving transducers whereas in the present invention, each transducer performs both transmitting and receiving functions sequentially. Thus, through the use of the present invention, more transmitter-receiver transducers may be placed in a given area. Furthermore, the Cudworth system uses no beam shaping techniques nor does it utilize time dependent gain control nor does it use microprocessor control and processing whereas the present invention includes each of these features.

Sato, et al. U.S. Pat. No. 3,778,823 discloses a system which senses an imminent collision so as to activate control means to blow up an air bag in a vehicle. The system operates through the use of microwaves and has separate transmitter and receiver antennas. The system measures both the position of an object and the speed by which the vehicle is approaching the object by the well known Doppler technique. The present invention is distinct from the teachings of Sato, et al. as utilizing ultrasound waves rather than microwaves, as using transducers which perform both the transmitting and receiving functions rather than separate transmitting and receiving transducers, and as utilizing beam-shaping techniques, time-dependent gain-control and microprocessor circuitry for control and processing, none of which are taught or suggested in Sato, et al.

Inoue U.S. Pat. No. 4,104,610 discloses an ultrasonic horn having a particularly shaped opening for beam shaping purposes. This device is different from the generally corresponding device in Applicant's system since Inoue discloses a horn whereas the present invention utilizes a slot which is significantly different therefrom. In one aspect, a horn in general cannot achieve as wide a beamwidth as can a slot and further, when size considerations are important, a transducer using a slot may be made much smaller than one which uses a horn.

Galvin, et al. U.S. Pat. No. 4,155,066 discloses an intrusion alarm system utilizing separate transmitting and receiving transducers having sensitivities which are reduced along the normal or boresight axis thereof and which are increased along axes angularly displaced from the boresight axis. This results in an energy pattern of reduced intensity along the boresight axis thereby reducing the intensity of standing waves which may occur thereat. This system is materially different from the present invention for many of the reasons set forth above and further because the Galvin, et al. device utilizes a cavity design to achieve a particular beam pattern whereas the present invention uses a slot to achieve a flat bell curve beam pattern.

Morgera U.S. Pat. No. 4,207,620 discloses an underwater mapping system utilizing a plurality of transducers which enable the measurement of a swath of terrain much wider than the beamwidth of the sonar pulses. This system is significantly different from the system of the present invention as failing to utilize beam shaping through the use of a slot and as failing to use a microprocessor for control and processing. The invention of Morgera only utilizes a microprocessor for beam steering and display purposes.

Duncan, et al. U.S. Pat. No. 4,240,152 discloses a device utilizing at least three transducers comprised of two transmitters and one receiver or one transmitter and two receivers which system may utilize a triangulation technique in order to find the location of an object. Of course, the present invention is different from the system as utilizing transducers which perform both the transmitting and receiving function. Furthermore, the present invention only measures the distance to the object whereas the system of Duncan, et al. utilizes a triangulation technique in order to find the location of the object, which is a complication for the purposes of the present invention. Further, other differences discussed above with regard to the other known prior art references also apply here.

Tournois U.S. Pat. No. 4,456,982 discloses a bidimensional imaging system which utilizes a transmitting array and a receiving array which system utilizes transmitted and received echoes. This system is believed to be related to Morgera, discussed above, and is discussed from the teachings of the present invention for the same reasons discussed with regard to Morgera.

Gelhard U.S. Pat. No. 4,500,977 discloses a motor vehicle mounted distance measuring device utilizing four different transducers and ultrasonic echo signals. Several differences exist between the teachings of Gelhard and those of the present invention. Firstly, Gelhard discloses a large number of different types of transducers which are used in his system whereas in the present invention, only a single transducer having the beam thereof shaped by a simple slot and controlled by the use of a time-gain scheme is used. Further, Gelhard teaches the use of a horn to narrow the beam in both directions whereas the present invention utilizes a slot. Thus, Gelhard is different from the present invention in the same manner as Inoue discussed above in this regard. Furthermore, the present invention utilizes the concepts of dynamic beam shaping, time-dependent gain-control and microprocessor control and processing none of which are taught or suggested by Gelhard.

Furthermore, Applicant is aware of U.S. Pat. Nos. 3,522,764; 3,523,275; 4,081,626; 4,085,297 and 4,199,246. Each of these patents discloses a transducer design per se and possibly the use of a particular transducer design in an application such as for a camera range finder. In the present invention, designs of transducers similar to those disclosed in some of these patents are utilized as a starting point and are extensively modified through the use of the slot device as set forth hereinabove for beam shaping purposes and thus, these references are believed to be of only general interest vis-a-vis the present invention.

The publication "A Prosthetic Aid for A Developing Blind Child" by Boys, et al. published in *Ultrasonics Magazine*, Jan., 1979, is believed to be only generally relevant to the teachings of the present invention as suggesting the concept of "blanking" during the measuring sequence. Otherwise, this publication is believed to be of only general interest concerning the teachings of the present invention.

Accordingly, a need has developed for an omnidirectional distance measurement system having the flexibility of beamwidth shaping, ease of control, flexibility of reprogramming low cost and a minimum of components. With these criteria in mind, the present invention was developed.

SUMMARY OF THE INVENTION

The present invention overcomes the deficiencies of prior art devices as discussed hereinabove and provides an omnidirectional distance measuring system fulfilling each and every one of the prerequisites set forth above as to flexibility of beamwidth shaping, ease of control, flexibility of reprogramming, low cost and component limitations. The present invention includes the following combination of integrated elements:

(a) In a first aspect of the present invention, in the preferred embodiment thereof, four ultrasonic transducers are provided. The beamwidth of each transducer is shaped using a specially designed slot. In one embodiment, the slot is formed by a separate device placed over the transducer. In another embodiment, the slot is formed in the conductive foil of the transducer itself. In yet another embodiment the slot is formed in the grooved metallic back-plate of the transducer itself. In the two latter mentioned embodiments, modification of the transducer is necessary.

(b) In a further aspect of the present invention, it is preferred that each of the transducers both transmits and receives ultrasonic waves. In this way, through the use of only four transducers, the present invention is able to detect the distance, direction and speed of four objects with respect to their respective transducers in the work area substantially simultaneously.

(c) In a further aspect of the present invention, the size of the work area is determined in the software which is created so as to control the operation of microprocessor controlling means for the system. In this regard, the system may be devised as desired to have an integral microprocessor capability or if desired, may be designed so as to interface with a separate microprocessor or computer.

(d) In the preferred embodiment, each of the four transducers uses an analog board to enable it to transmit and receive ultrasonic waves. Transformer circuitry associated with the transducer is pulsed so as to provide the high voltage necessary to transmit ultrasonic waves. A bias voltage is kept on the transducer after transmission enabling the transducer to be used as a microphone in order to receive ultrasonic waves. In a further aspect, the circuitry incorporates a blanking circuit so that each transducer's receiver is cleared immediately prior to the emission of ultrasonic waves and held clear until a predetermined time after the emission so as to avoid receiving false signals caused by transducer ringing. The transformer circuitry is shortened on the secondary side immediately after the transmission of sufficient pulses has taken place. This causes a large impedance on the primary side of the transformer circuitry and therefore in series with the resonant receiving circuitry, which dampens the ringing of the transducer faster. The transformer circuitry is shortened until receiver is stopped being cleared (blanked).

(e) In an important aspect of the present invention, "time gain" control is provided by the computer or microprocessor to control the signals received by the transducers. In this regard, the receiver for each transducer is in a low gain setting to start with, and the gain is increased in steps as time elapses in order to compensate for the attenuation of ultrasound in air as a function of the distance. Thus, any one transducer in accordance with the present invention will initially receive in a low gain setting and then the gain is increased over time until such time as an echo indicating the presence of an object is received.

(f) The present invention, in the preferred embodiment, is devised so that all four transducers operate through a common microprocessor control device. Thus, when, for example, four transducers are utilized, ultrasonic waves from the transducers are transmitted sequentially and with sufficient spacing between the transmission and receiving until the ringing of the transducer is lower than a predetermined level, through the use of a blanking circuit so that the microprocessor can receive and interpret the appropriate reflected signals from the objects which are being tracked by the transducers. The time elapsed between transmission and receiving the return signal (echo) is proportional to the distance travelled by the ultrasound. Since the speed of sound is known, the distance can be calculated.

(g) In a further aspect of the present invention, the system embodied in the present invention may be utilized in many diverse applications such as those of collision avoidance for vehicles, distance measuring on robots, intrusion detecting security devices, detection systems for the disabled such as the blind, and speed and position detection.

Accordingly, it is a first object of the present invention to provide an omnidirectional distance measurement system.

It is a further object of the present invention to provide such an omnidirectional distance measurement system which in the preferred embodiment may measure the distance and location of an object with respect to a fixed transducer and the speed of an object in a defined work space.

It is a further object of the present invention to provide such a system wherein the number of objects which may be measured corresponds to the number of transducers utilized in the system.

It is a still further object of the present invention to provide such a system wherein each transducer provides both the transmitting and receiving functions.

It is a still further object of the present invention to provide such a system wherein beam shaping is utilized as a modification of known transducers so as to accurately define the space within which measurements are to be taken.

It is a yet further object of the present invention to provide such a system which may incorporate integrally its own microprocessor or computer or may be designed so as to interface with a separate microprocessor or computer as desired.

It is a still further object of the present invention to provide such a system wherein the associated microprocessor or computer is programmed to control emission of ultrasonic waves from the respective transducers and the gains of the negative receivers, which are variable with time, for the specific purposes set forth hereinafter These and other objects, aspects, and features of the present invention will be better understood from the following detailed description of the preferred embodiments when read in conjunction with the appended drawing figures.

BRIEF DESCRIPTION OF THE DRAWINGS

FIG. 4 shows an exploded perspective view of an ultrasonic transducer modified with the provision of a beam shaping slot. The slot is narrowing the beamwidth in the vertical direction and is widening the beamwidth in the horizontal direction.

FIG. 5 shows an exploded perspective view of an ultrasonic transducer modified with a beam shaping slot. The slot makes the beamwidth wider in both the horizontal and the vertical direction.

FIG. 6 shows an exploded perspective view of a further embodiment of transducer wherein the beam shaping slot is formed in the conductive foil thereof.

FIG. 9 shows a flow chart of the present invention including the use of four transducers.

SPECIFIC DESCRIPTION OF THE PREFERRED EMBODIMENTS

Figure 1:
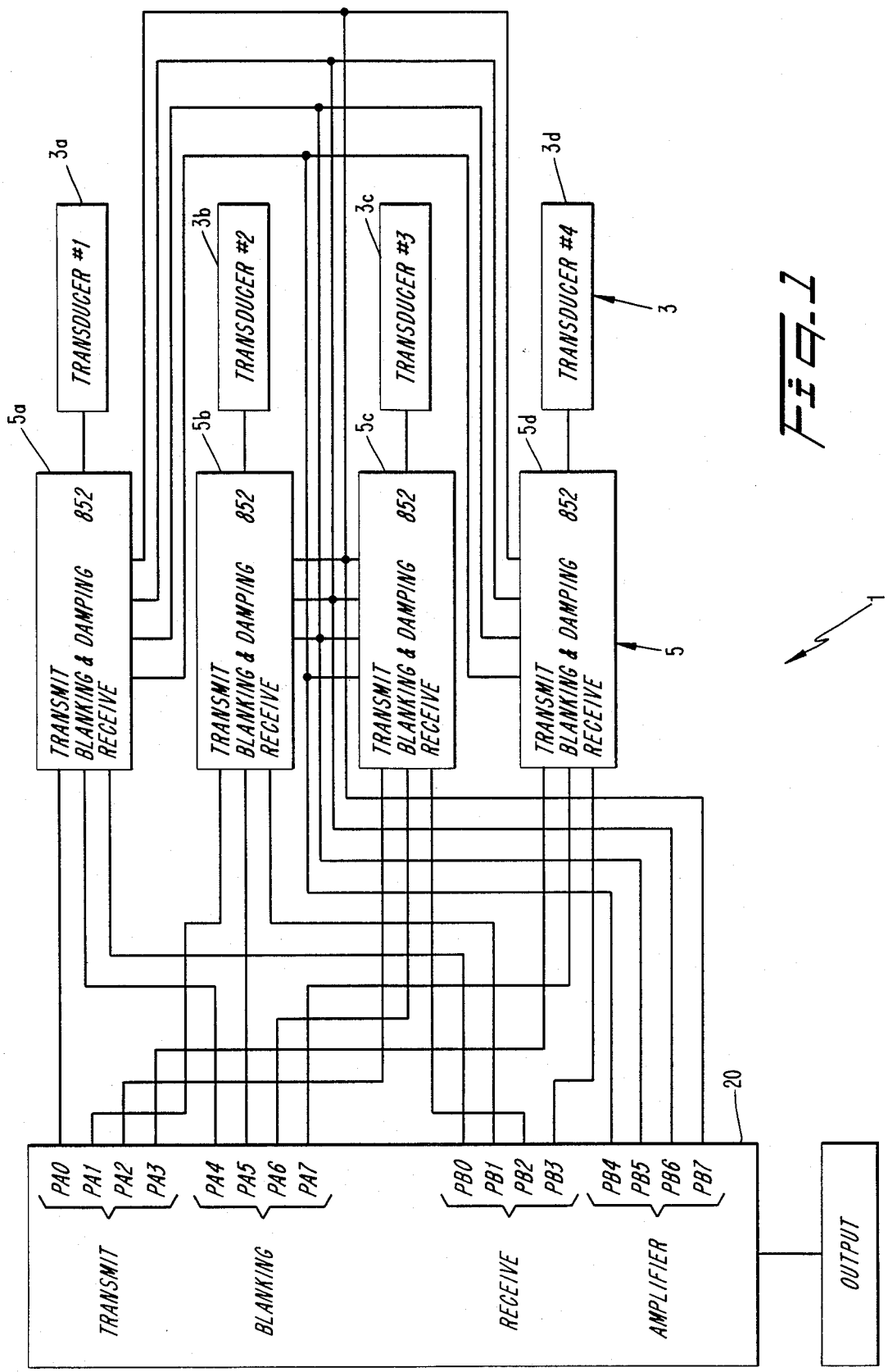
FIG. 1 shows a block diagram of a preferred embodiment of the present invention.

With reference now to FIG. 1, a block diagram of a preferred embodiment of the present invention in the form of the system designated by reference numeral 1 is seen. As shown, a plurality of transducers 3 are provided which in the preferred embodiment are four in number and are designated in FIG. 1 with reference numerals 3a, 3b, 3c and 3d. Connected to each transducer 3 is a circuit 5 which interfaces the transducers 3 with the control means 20 which may be a microprocessor or a single-chip microcomputer. As should be understood, the control means 20 controls the transducers 3 via the circuit 5 so as to control the transmission of ultrasonic waves, the number of pulses, the frequencies of the different pulses, the blanking of the circuits, the attenuation of the ringing of the transducer and the receipt of reflected echos which provide information to the control means 20 so as to enable it to calculate range, location and speed of objects which are being tracked by the system 1.

Figure 2:
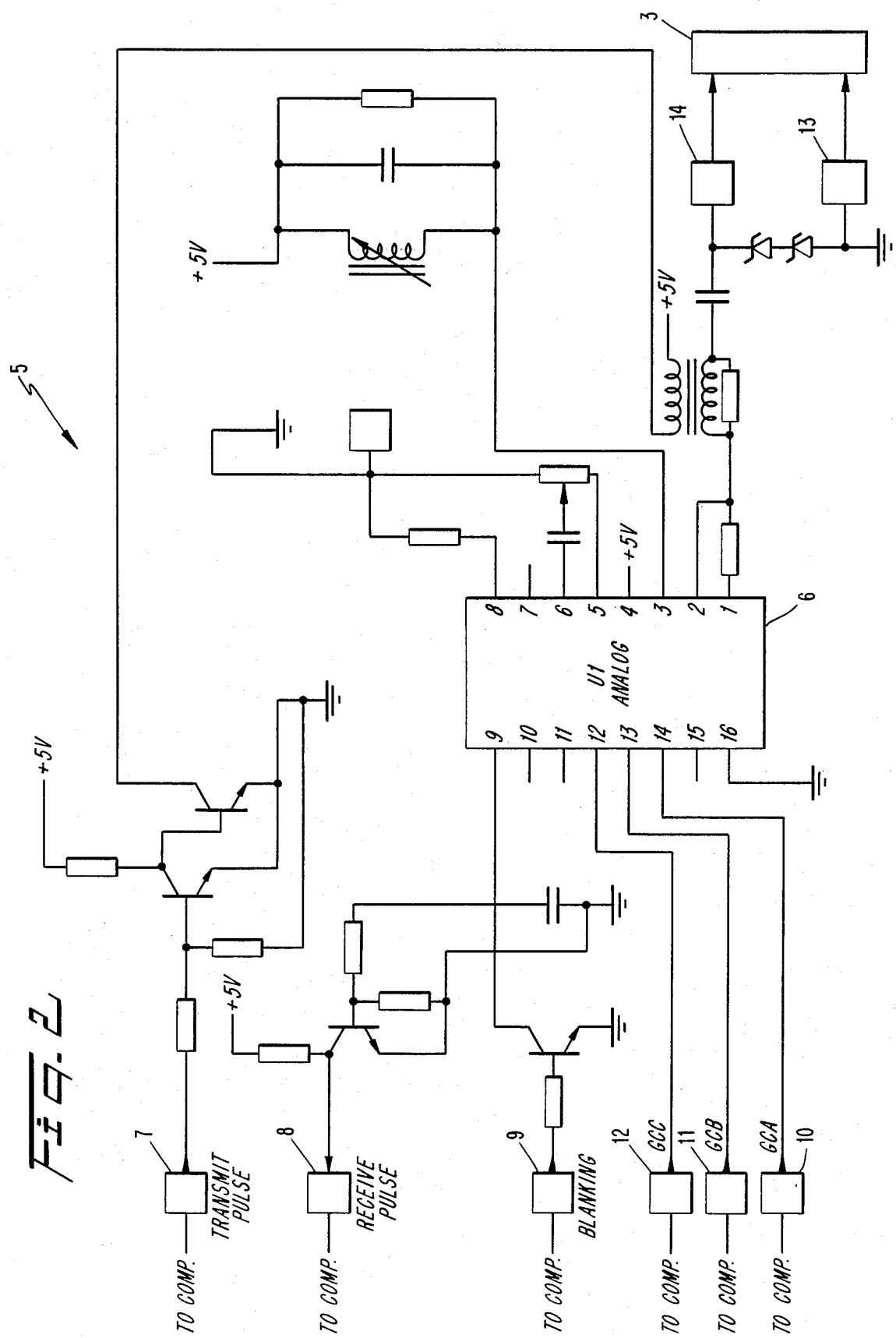
FIG. 2 shows a first embodiment of the circuitry from the block diagram of FIG. 1, omitting the microprocessor or computer circuitry for detail.

With reference now to FIG. 2, an electrical circuit is shown which comprises a first embodiment of a circuit corresponding to those which are referred to by the reference numeral 5 in FIG. 1. The circuit 5 includes a chip 6 which may, if desired, be a U1 ranging receiver such as that manufactured by Texas Instruments for use by the Polaroid Company. The circuit 5 includes a plurality of ports numbered 7, 8, 9, 10, 11, 12, 13 and 14.

As shown in FIG. 2, the port 7 controls the transmission of ultrasonic pulses by the transducers 3, including the number of pulses and the frequencies of the different pulses. This is set in the software in the microprocessor or the single-chip microcomputer. The port 8 communicates to the control means echos which have been received by the transducers 3 in response to the transmitted ultrasonic pulses. The port 9 conveys signals from the control means to the circuit 5 which signals cause the circuit 5 to be blanked immediately before the transmission and until the ringing of the transducer is below a predetermined level so as to prevent the receipt of false signals from the transducer ringing caused by the transmission.

The ports 10, 11 and 12 are binary ports which are utilized to control the gain of the particular pulses which are transmitted by the transducers 3. These ports are binary in that the port 10 corresponds to $2^0$, the port 11 corresponds to $2^1$ and the port 12 corresponds to $2^2$ such that gain increment levels of from 0 to 7 may be provided through the various combinations of the ports 10, 11 and 12 being activated. For example, if the ports 10 and 12 are activated, the gain level would correspond to the number 5 out of 7 levels. If all three ports 10, 11 and 12 are activated, gain level 7 would be attained. In a still further example, if ports 10 and 11 are activated, gain level 3 would be attained. Port 12 also includes a flip-flop, which is triggered by a negative going pulse, so when gain step 7 has been set and ports 10, 11 and 12 are switched to zero, the gain is set to step eight. The method described above will then set the gain steps from 8 to 15. It is possible to set gain step zero next time the ports 10, 11 and 12 are switched to zero. In this way, the control means through the selective activation of the ports 10, 11 and 12 controls the level of the gain of the ultrasonic pulses transmitted by the transducers 3. In the embodiment of FIG. 2, 3 gain level ports 10, 11 and 12 are shown. Of course, the more gain ports there are, the more incremental levels of gain control are available.

Also shown in FIG. 2 are two ports 13 and 14 each of which connects the circuit 5 with a transducer 3. As should further be understood, the ports 7, 8, 9, 10, 11 and 12 are connected to a control means such as the control means 20 schematically depicted in FIG. 1.

Figure 3:
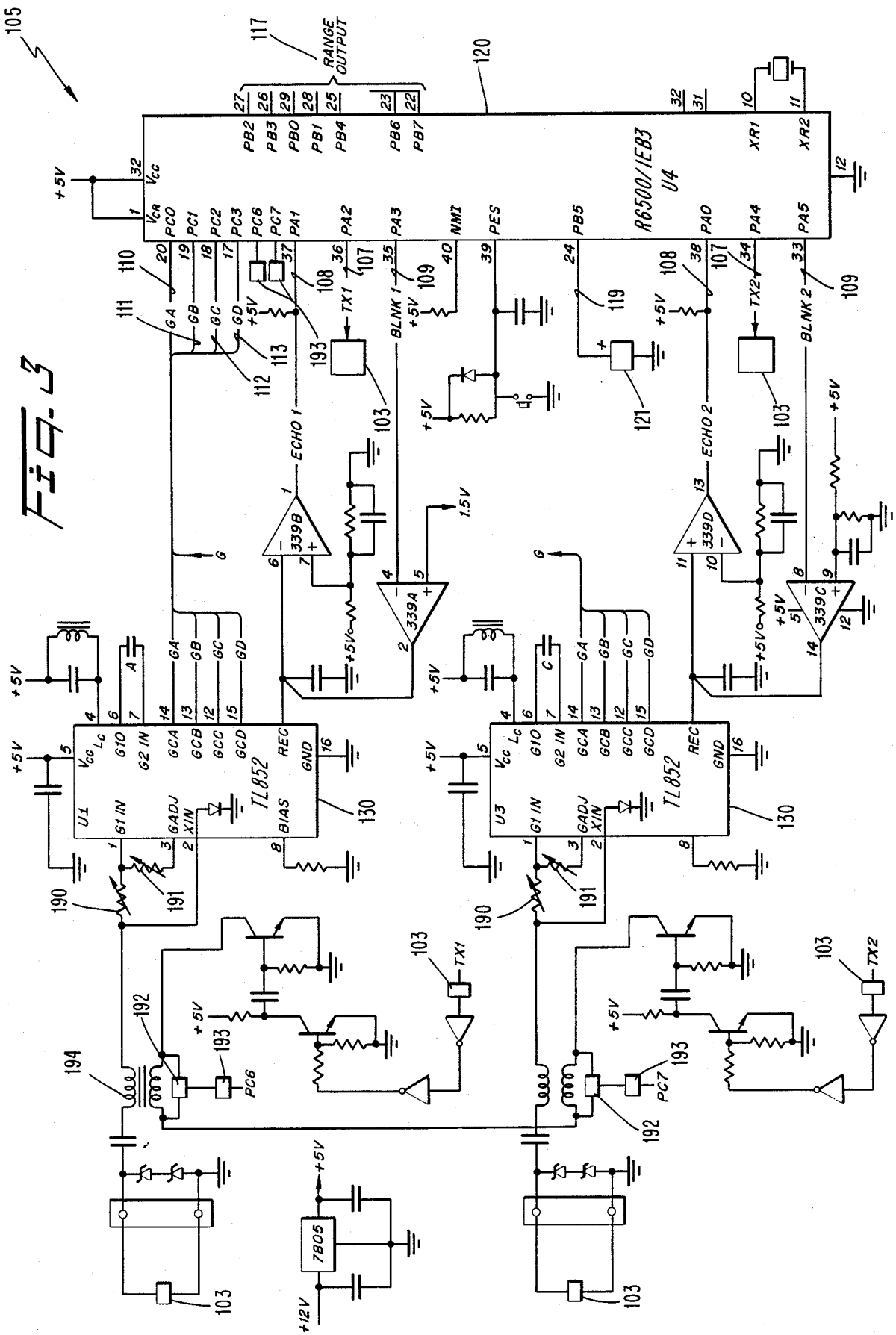
FIG. 3 shows a further embodiment of the circuitry of the embodiment of FIG. 1 including a single-chip microcomputer.

Reference is now made to FIG. 3 wherein a further embodiment of the circuit 5 is shown and designated by reference numeral 105. The circuit 105 is similar to the circuit 5 but differs as including integrally formed therewith a control means 120 corresponding to the control means 20 in FIG. 1 which control means 120 may, if desired, be a microprocessor or computer but in the example shown in FIG. 3 comprises a Rockwell R6500 microcomputer. This is to be considered merely exemplary as any computer corresponding in functions to this microcomputer may be utilized in the circuit 105. Furthermore, FIG. 3 merely shows a circuit representative of the circuits which may be employed in the present invention since the FIG. 3 circuit only shows circuitry for use with two transducers 103. As should be understood by those skilled in the art, the circuit 105 may be augmented through the use of additional ports in the control means 120 so as to include as many transducers 103 as are necessary. As shown, the control means 120 includes the ports 107 which control the transmission of ultrasonic pulses by the transducers 103, the ports 108 which control the receipt of echoes created by the reflection of the transmitted pulses of the objects which are being tracked by the system. It is possible to set the number of pulses for transmission and the frequencies of the different pulses in the software of the single-chip microcomputer 120 in a manner well known to those skilled in the art. Further, the control means 120 includes the blanking ports 109 which control the conveyance of signals from the control means 120 which signals cause receiver 130 of the circuit 105 to be blanked a predetermined time starting immediately before the transmission and ending when the ringing of the transducer 103 is less than a predetermined level. Further, the control means 120 includes switching ports 193 which control the switching of a shortening 192 of the secondary side of the transformer 194, which will cause a large resistor on the primary side of the transformer 194 to be placed in series with the resonant receiver circuit in order to attenuate the ringing of the transducer. The resistor is switched in immediately after the transmission and switched out when the blanking of the receiver 130 is stopped.

Further, the circuitry 105 includes a variable resistor 190 and a variable resistor 191. The ratio of resistor 191 to resistor 190 determines the gain of the preamplifier in circuit 103. The value of resistor 190 determines the attenuation of the received signal (echo), the ringing of the transducer and the noise picked up by the transducer. Further, the control means 120 includes ports 110, 111, 112 and 113 which correspond to the ports 10, 11, and 12 in FIG. 2. The provision of four ports provides gain levels in increments from 0 to 15 depending upon which of the ports are activated by the control means 120, without the use of an internal flip-flop. The gain steps as a function of time can be set in the software in the single-chip microcomputer 120. Only a number of the available gain steps are needed in most applications.

For each transducer 103, a chip 130 is provided which in some respects is analogous to the chip 6 illustrated in FIG. 2. In the circuit embodiment shown in FIG. 3, the chip 130 is preferably a Texas Instrument TL852 integrated circuit. The chip 130 has slightly more flexibility than the chip 6 which is exemplified by, for example, the provision of four gain level ports rather than the three gain level ports available with the chip 6 shown in FIG. 2. As further shown in FIG. 3, the control means 120 includes range output ports commonly designated with the reference numeral 117 which provide any one of an audible or visual display or indication of the signals which have been received by the control means 120 responsive to the transmission of ultrasonic pulses by the transducers 103. The port 119 provides connection to a further audible feedback device 121 which may, for example, comprise a buzzer. The rest of the circuit should be understood by those skilled in the art.

Reference is now made to FIGS. 4, 5, 6 and 7 wherein four examples of transducers usable with the present invention are shown. In FIG. 4, a transducer assembly 203 is seen to include a transducer 205 and a beam shaping device 207 having a slot therein designated by the reference numeral 209. It further has a metallic encapsule, 201, which is grounded in order to lower the noise picked up by the transducer 205. The slot 209 will narrow the beam in the vertical direction and widen the beam in the horizontal direction. The beamwidth of the modified transducer can be estimated by using the equation for a rectangular piston:

$$P(\theta) = P_o \frac{\sin\left(\frac{\pi d}{\lambda}\sin\theta\right)}{\frac{\pi d}{\lambda}\sin\theta}$$

Where
$P(\theta)$ = the sound pressure as a function of the off-axis angle
$\theta$ = off-axis angle
$P_o$ = constant pressure
$d$ = width of slot
$\lambda$ = wavelength of ultrasound It is possible, from this equation, to find the on-axis sound pressure as a function of the slot width. It is also possible to find the 3 dB beamwidth in degrees as a function of the slot width.

In FIG. 5, a transducer assembly 203' is seen to include a transducer 205, a beam shaping device 207' having a slot therein designated to the reference numeral 203'. It further has a metallic encapsule, 201, which is grounded, in order to lower the noise picked up by the transducer. The slot 209' is of circular shape and will widen the beam in both the horizontal and the vertical directions. The beamwidth of the modified transducer can be estimated by using the equation for a circular piston:

$$P(\theta) = P_o \frac{2J_1(Ka\sin\theta)}{Ka\sin\theta}$$

Where $$K = \frac{2\pi}{\lambda}$$

$\lambda$ = wavelength of the ultrasound
$P(\theta)$ = the sound pressure as a function of the off-axis angle
$P_o$ = constant sound pressure a = radius of the circular piston
J₁ = the bessel function of first order It is possible, from the equation, to find the on-axis sound pressure as a function of the slot radius. It is further possible to find the 3dB beamwidth as a function of the slot radius. It is of course, also possible to find the on-axis sound pressure and the 3dB beamwidth of the transducer 205, without a slot modification. It is possible to estimate the on-axis sound pressure and the 3dB beamwidth from an elliptical slot modification, by either looking at an elliptical piston or a combination of the two equations above.

The slot device 207 and 207' in FIGS. 4 and 5 is made by a sound absorbing material or it is padded on the inside with a sound absorbing material in order to attenuate the standing waves caused by the beam shaping slot device, which will cause more ringing of the transducer 205.

With reference now to FIG. 6, a transducer assembly 203'' is seen to include a beam shaping slot 209'' integrally formed in the conductive foil member 208 of the transducer. As is well known in the art, the transducer assembly 203' further includes an inner ring 211, a retainer 213, a groove plate 215 and a housing cover 217. The beamwidth and the on-axis sound pressure of this slot modification can be estimated by using the equations above.

Figure 7:
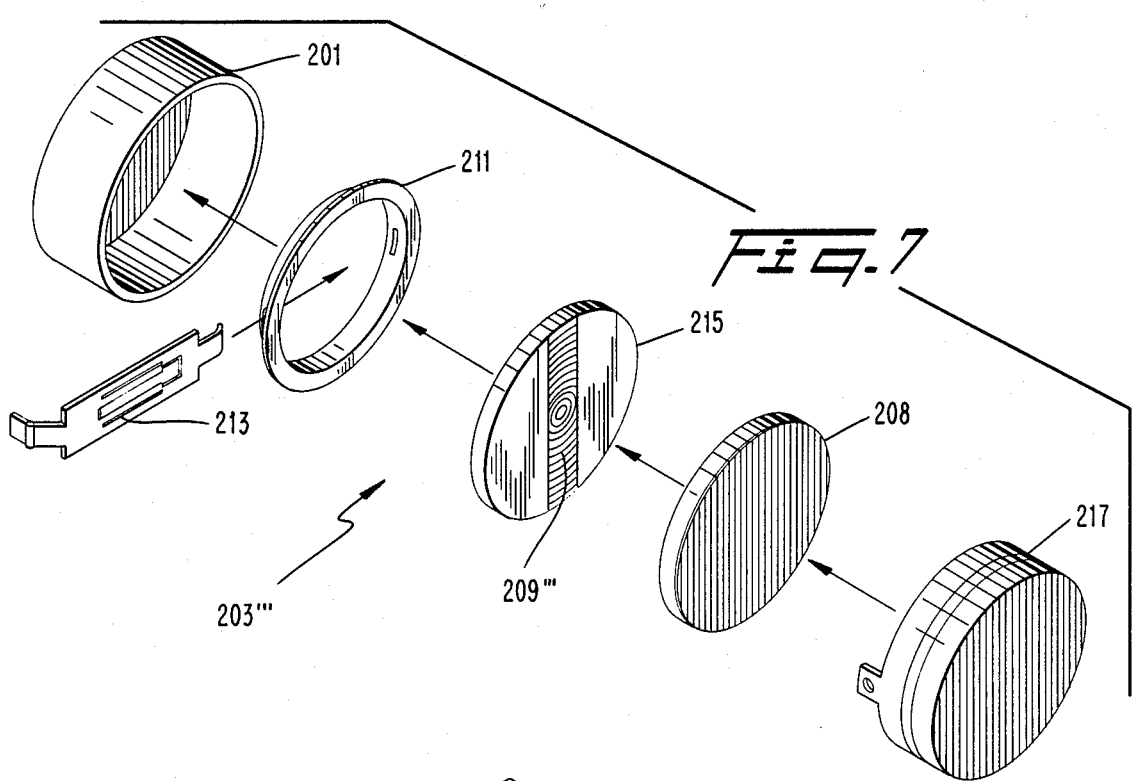
FIG. 7 shows an exploded perspective view of a further embodiment of an ultrasonic transducer wherein the beam shaping slot is formed in the grooved metallic back-plate thereof.

With reference now to FIG. 7, a transducer assembly 203''' is seen to include a beam shaping slot 209''' integrally formed in the grooved-metallic back-plate 215 of the transducer. The beamwidth and the on-axis sound pressure of this slot modification can be estimated by the use of the equations above.

Figure 8:
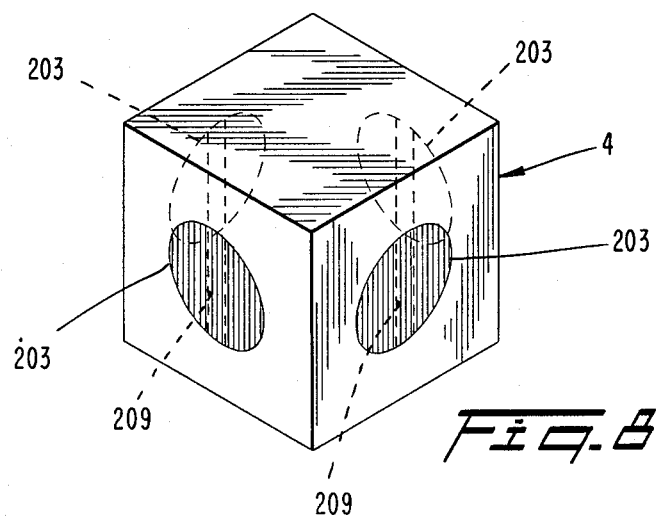
FIG. 8 shows a perspective view illustrating the employment of four transducers in the inventive system.

FIG. 8 shows an arrangement of four transducers designated by reference numeral 203 as mounted on a housing 4 shaped somewhat like a cube with each transducer being on a separate side face of the cube 4. As shown in figure 6, the beam shaping slot 209 of each transducer 203 is specifically oriented so that the combination of all four transducers 203 as facing away from separate faces of the cube 4 results in an omnidirectional coverage for the system utilizing the transducers as shown in FIG. 8.

FIG. 9 depicts a flow chart of the operation of the present invention and should aid in explaining how the present invention in the preferred embodiment thereof is intended to operate. Since FIG. 9 shows a flow chart for the operation of the present invention wherein four transducers are utilized, with the operation of the system for each transducer being identical to that of the other transducers, the explanation herein below for one transducer will be equally applicable for all transducers.

Figure 10:
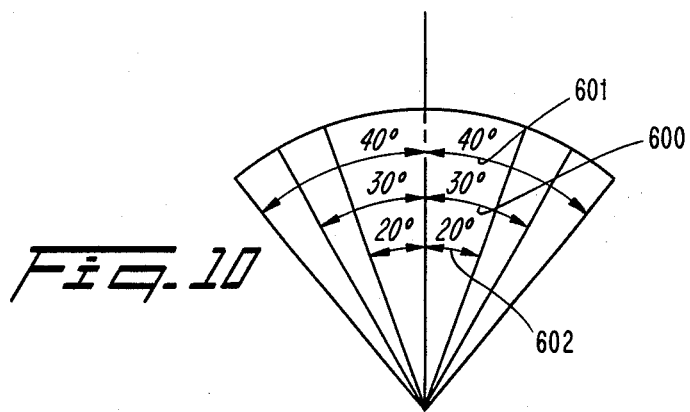
FIG. 10 shows the effective beamwidth of the system for various initial gain settings.

FIG. 10 shows how the time gain control also can be used for dynamic beamwidth setting. A first gain setting 600 will have an effective beamwidth of 60 degrees, depending upon the number of pulses transmitted, frequency of the ultrasound, the transducers beamwidth and the gain step setting. If a higher initial gain step is used, all the gain steps will therefore automatically be higher, which means that the effective beamwidth of the system 601 will be wider than before, here 80 degrees. If a lower initial gain step is used, all the gain steps will therefore automatically be lower, which means that the effective beamwidth of the system 602, will be narrower than before, here 40 degrees.

Figure 11:
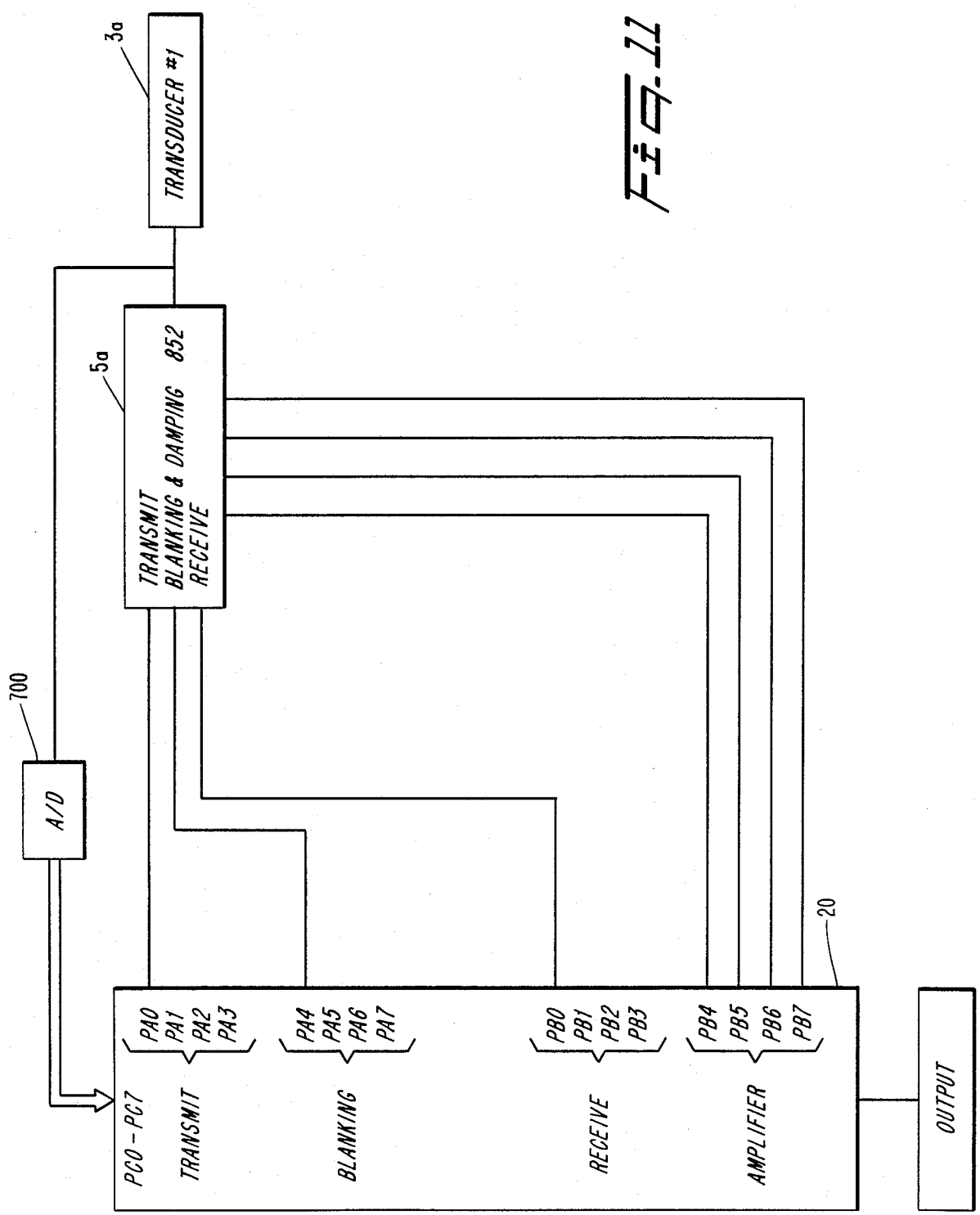
FIG. 11 shows the circuitry for measuring the ringing of the transducer initially and storing the measurement in the computer memory.

FIG. 11 shows how it is possible to measure the ringing of the transducer initially via an analog-to-digital converter 700 and to store it in the computer memory.

Figure 12:
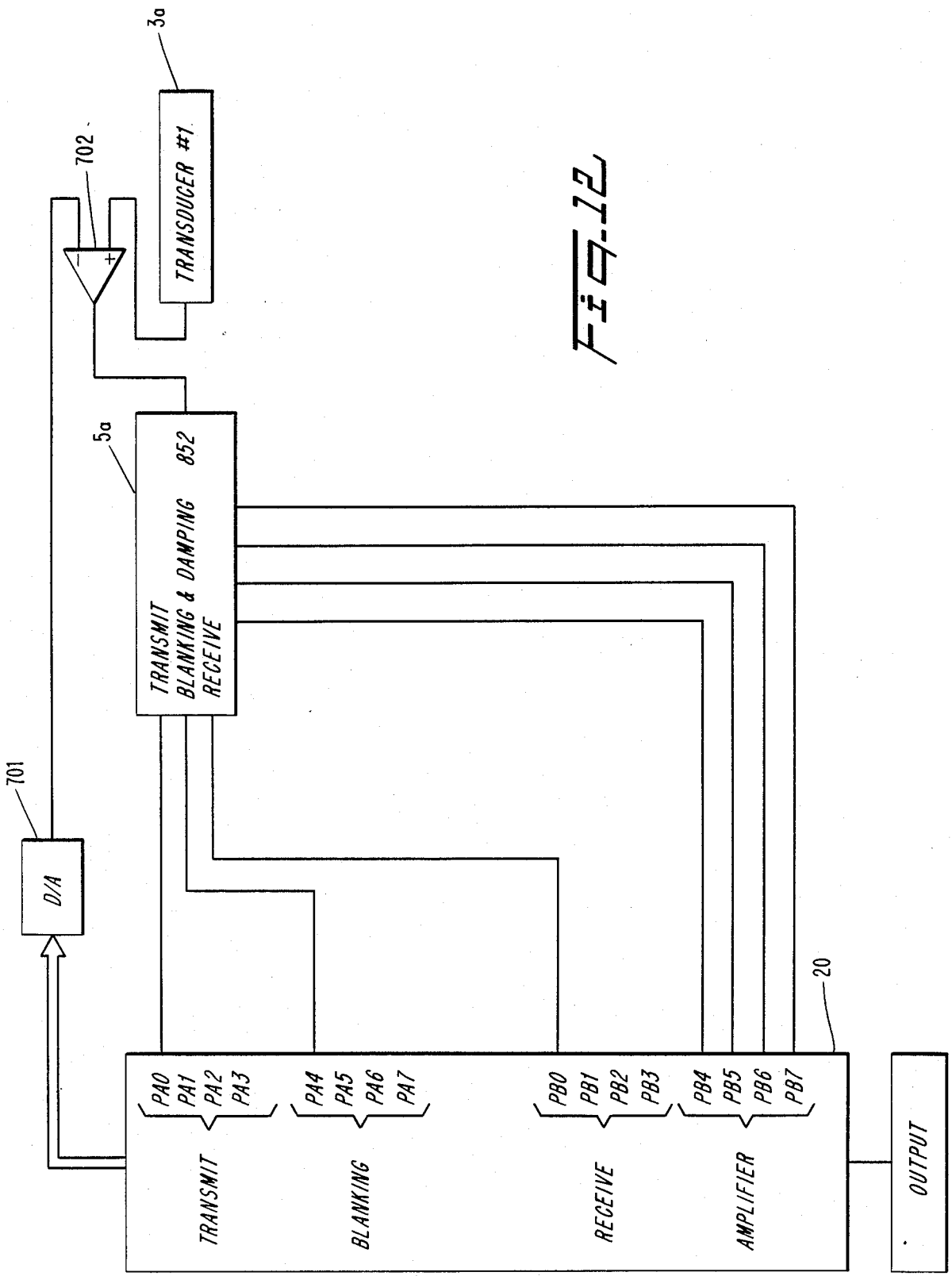
FIG. 12 shows the circuitry for subtracting the stored information of the transducer ringing from the measured transducer signal in order to compensate for the transducer ringing.

FIG. 12 shows how it then is possible to subtract the stored information from the transducer signal via the use of a digital-to-analog convertor 701 and an operational amplifier. Since the ringing of the transducer is almost the same for each transducer each time it is activated, the above subtraction will eliminate most of the ringing problem. It will therefore be possible to shorten the blanking time, described above, and therefore measure distances almost immediately next to the transducer.

It should be understood that the time gain control of transducer transmissions operates as follows:

First, the transmission of ultrasonic pulses is done and the transducer which also comprises the receiver waits for a predetermined preprogrammed time for an echo to be received indicative of the fact that an object which is being tracked is within a predetermined space. If an echo is received within the predetermined time, the appropriate calculations are accomplished by the associated control means such as a microprocessor or computer so as to calculate the distance, location, and/or speed of the object with respect to the transducer.

If, on the other hand, an echo is not received within the predetermined time period, the gain is increased by resetting the gain ports as explained, for example, hereinabove with regard to FIG. 3, with regard to the gain ports $G_A$, $G_B$, $G_C$, and $G_D$. After the next higher gain has been set, as preprogrammed in the control means, the system waits again for a predetermined time. Again, if an echo indicative of the fact that an object being tracked is within the predetermined space is received, then as preprogrammed, the control means will calculate the distance, location, and/or speed of the object. If not, the above described process is repeated by again increasing the gain through the use of the gain ports and then waiting for an echo with a succeedingly higher gain. This process is repeated until the receiver is set in its highest gain setting and if no echo is received within a predetermined time the system will start over again and so on until an echo is received and indicative of the fact that an object has been located within the predetermined space and the distance, location and/or speed of the object is calculated and may be displayed as desired.

This same procedure is also completed for each transducer connected into the system either simultaneously with the procedure as carried out with the first transducer or consecutively, only depending upon the capacity of the control means.

It should further be understood that between the ultrasonic pulse transmission and receiving, the system is blanked as set forth in the flow chart and explained hereinabove so as to ensure that false signals are not received by the transducer which would exist from the ringing, which is a vibration of the membrane of the transducer caused by the transmission, until this has died down to a predetermined level, which is below the level at which it would be detected as an echo.

The present invention has been disclosed in terms of a preferred embodiment thereof, including the use of four transducers. In a system in accordance with the present invention, which includes four transducers, omnidirectional distance measurement may be obtained. However, it should be understood that the present invention is not intended to be limited to a system including the use of four transducers. For example, a single transducer may easily be utilized with the present invention so as to obtain information relating to the location of an object within one quadrant of a defined space or any smaller part thereof. Accordingly, the description of a preferred embodiment as set forth hereinabove should only be considered to be exemplary of the teachings of the present invention.

Accordingly, an invention has been disclosed herein which fulfills each and every one of the objects set forth in the summary of the invention. It should be understood that various changes, modifications and alterations to the teachings of the present invention as set forth hereinabove may be contemplated by those skilled in the art. As such, it is intended that the present invention only be limited by the terms of the following claims.

I claim:

1. A system for measuring a distance to at least one object in a predetermined non-liquid filled space comprising:
   (a) a plurality of ultrasonic transducers, each said transducer being adapted to transmit and receive ultrasonic pulses;
   (b) beam shaping means associated with each said transducer for shaping the beamwidth of each said transducer in a predetermined manner enabling both widening and narrowing of said beamwidth;
   (c) control means for controlling said system connected to said transducers via integrated circuit means for directly controlling transmission of pulses from said transducers and for conveying signals related to echoes received by said transducers to said control means;
   (d) said control means and integrated circuit means being preprogrammed to effect time gain control of said transducers to increase gain as a function of time; and
   (e) said control means being programmed to (1) measure the time from transmission of pulses by said transducers to the time from transmission of pulses by said transducers to receiving of pulses reflected from said object, and (2) therefrom to calculate the distance between the object and said transducers.

2. The invention of claim 1, wherein said beam shaping means comprises a plate with a hard surface for each transducer with a slot formed therein, each said plate being installed in front of a respective transducer where sound pressure is in a null so as to shape said beamwidth.

3. The invention of claim 2, wherein said plate includes a separate layer made of a sound absorbing material or is padded on the inside facing the transducer with a sound absorbing material so as to attenuate the standing sound waves caused by the beam shaping slot.

4. The invention of claim 1, wherein each said transducer includes a foil layer including conductive and nonconductive regions, said conductive region comprising said beam shaping means and being formed in the shape of a slot.

5. The invention of said claim 1, wherein each said transducer includes a grooved metallic backplate including grooved and nongrooved regions, said grooved region comprising said beam shaping means and being formed in the shape of a slot.

6. The invention of any one of claims 2, 3, 4 or 5, wherein said slot is formed vertically.

7. The invention of any one of claims 2, 3, 4 or 5, wherein said slot is formed horizontally.

8. The invention of any one of claims 2, 3, 4 or 5, wherein said slot is elliptical.

9. The invention of claim 1, wherein said control means comprises a computer.

10. The invention of claim 1, wherein said control means comprises a microcomputer.

11. The invention of claim 1, wherein said circuit means include a circuit controllable by said control means for enabling said circuitry to transmit a predetermined number of pulses controlled by software.

12. The invention of claim 1, wherein said integrated circuit means includes a sub-circuit means controllable by said control means for transmitting said pulses at predetermined frequencies controlled by software.

13. The invention of claim 1, wherein said integrated circuit means includes a sub-circuit means for enabling said time gain control, said sub-circuit means including a plurality of on-off switches, each said switch corresponding to a predetermined gain level, said switches being controlled by said control means to set a desired gain level for said pulses.

14. The invention of claim 1, wherein said integrated circuit means includes a sub-circuit means including a preamplifier means for enabling additional gain by adjustment of said preamplifier, in order to select a first gain step to be higher than a previously selected gain.

15. The invention of claim 1, wherein said integrated circuit means includes a sub-circuit means controllable by said control means for blanking said transducers for a predetermined blanking time, starting immediately before a transmission and ending at a further predetermined time, when ringing of the transducers is below a predetermined level, said blanking time being programmed into associated software and determining a minimum detectable distance of said object.

16. The invention of claim 1, wherein said integrated circuit means includes a sub-circuit means for increasing the resistance in series with a resonant receiver circuit in order to attenuate ringing of the transducer and noise picked up by the transducer.

17. The invention of claim 1, wherein said integrated circuit means includes a sub-circuit means controllable by said control means for closing a switch on a primary side of a transformer in a transmitter circuit of said control means and thereby switching a large resistor into series with a resonant receiver circuitry in order to quickly attenuate ringing of at least one of said transducers, said switching being accomplished through software programming.

18. The invention of any one of claims 1, 2, 3, 4, 5, 10, 11, 12, 13, 14 or 15 wherein said plurality of transducers comprises four transducers.

19. The invention of claim 18, wherein said transducers are mounted in a housing with each transducer facing perpendicularly with respect to two adjacent transducers, said beam shaping means being arranged so that said transducers combine to form an omnidirectional distance measurement system.

20. The invention of claim 19, wherein said at least one object comprises up to four objects, the speed and range of which may be measured by said system.

21. The invention of anyone of claim 1, 2, 3 or 4 wherein at least one of said transducers is placed in a grounded metallic enclosure so as to be able to use said at least one transducer within a magnetic field, an electrical field or an electromagnetic field and in order for said transducer to pick up less noise.

22. The invention of claim 1 wherein said time gain control is used to dynamically widen or narrow the effective beam of a single transducer in both the horizontal and the vertical directions by programming of associated software.

23. The invention of claim 1, wherein ringing of the transducer is measured initially and stored in a memory of said control means, and is thereafter subtracted from a measured transducer signal when the system is operated.

24. A system for locating at least one object in a predetermined space comprising:
(a) a plurality of ultrasonic transducers, each said transducer being adapted to transmit and receive ultrasonic pulses;
(b) beam shaping means associated with each said transducer for shaping the beamwidth of each said transducer in a predetermined manner enabling both widening and narrowing of said beamwidth;
(c) control means for controlling said system connected to said transducers via integrated circuit means for directly controlling transmission of pulses from said transducers and for conveying signals related to echoes received by said transducers to said control means;
(d) said control means and integrated circuit means being programmed to effect time gain control of said transducers; and
(e) each said transducer including a grooved metallic backplate including grooved and non-grooved regions, said grooved region comprising said beam shaping means and being formed in a shape of a slot, at least one of said transducers being placed in a grounded metallic enclosure so as to be able to use said at least one transducer within a magnetic field, an electrical field or an electromagnetic field and in order for said transducer to pick less noise.

25. A system for locating at least one object in a predetermined space comprising:
(a) a plurality of ultrasonic transducers, each said transducer being adapted to transmit and receive ultrasonic pulses;
(b) beam shaping means associated with each said transducer for shaping the beamwidth of a beam of each said transducer in a predetermined manner;
(c) control means for controlling said system connected to said transducers via integrated circuit means for directly controlling transmission of pulses from said transducers and for conveying signals related to echoes received by said transducers to said control means, said integrated circuit means including a sub-circuit means for enabling time gain control, said sub-circuit means including a plurality of on-off switches, each said switch corresponding to a predetermined gain level, said switches being controlled by said control means to set a desired gain level for said pulses, said time gain control sub-circuit means being used to dynamically widen or narrow each said beam in both the horizontal and the vertical directions.

26. A system for measuring a distance to at least one object in a redetermined non-liquid filled space comprising:
(a) a plurality of ultrasonic transducers, each said transducer being adapted to transmit and receive ultrasonic pulses;
(b) beam shaping means associated with each said transducer for shaping the beamwidth of each said transducer in a predetermined manner;
(c) control means for controlling said system connected to said transducers via integrated circuit means for directly controlling transmission of pulses from said transducers and for conveying signals related to echoes received by said transducers to said control means;
(d) said control means and integrated circuit means being preprogrammed to effect time gain control of said transducers to increase gain as a function of time and to dynamically widen or narrow the effective beam of a single transducer in both the horizontal and vertical directions by programming of associated software; and
(e) said control means being programmed to (1) measure the time from transmission of pulses by said transducers to the time for transmission of pulses by said transducers to receiving of pulses reflected from said object and (2) therefrom to calculate the distance between the object and said transducers.

* * * * *